(No Model.)
J. O. TEFFT & C. W. CARPENTER.
GLOBE VALVE.
No. 423,288. Patented Mar. 11, 1890.
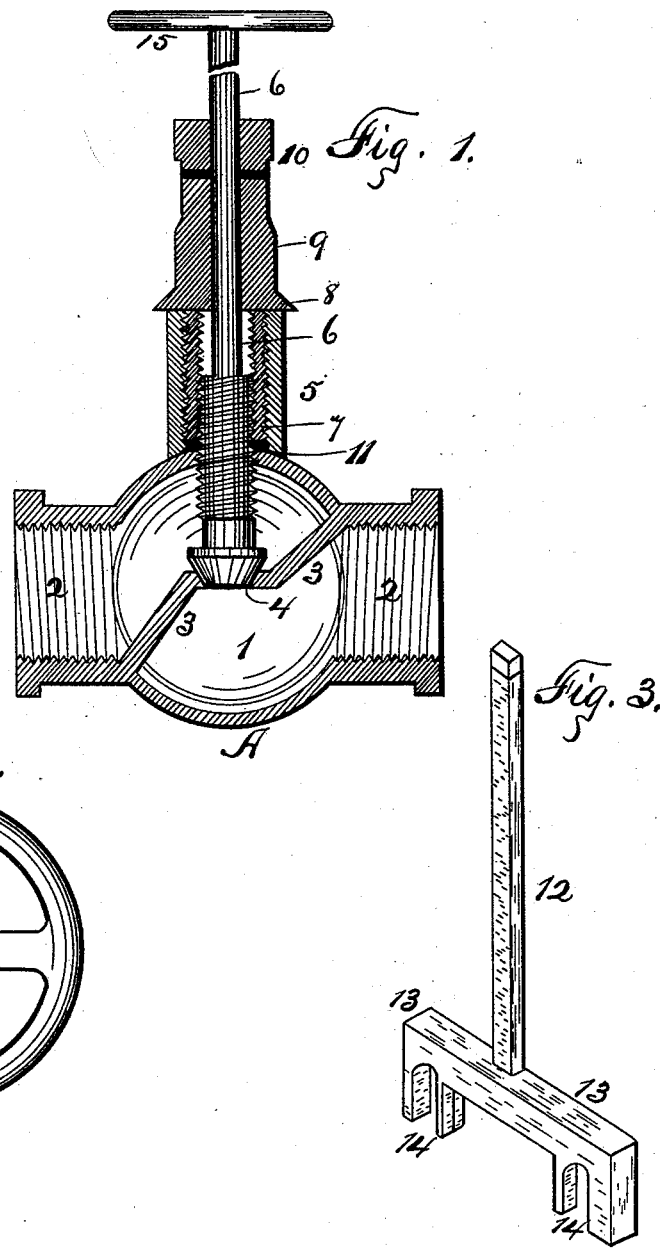

UNITED STATES PATENT OFFICE.

JAMES O. TEFFT AND CHARLES W. CARPENTER, OF OLEAN, NEW YORK.

GLOBE-VALVE.

SPECIFICATION forming part of Letters Patent No. 423,288, dated March 11, 1890.

Application filed November 15, 1889. Serial No. 330,374. (No model.)

*To all whom it may concern:*

Be it known that we, JAMES O. TEFFT and CHARLES W. CARPENTER, of Olean, in the county of Cattaraugus, in the State of New York, have invented new and useful Improvements in Globe-Valves, of which the following, taken in connection with the accompanying drawings, is a full, clear, and exact description.

Our invention relates to globe or other valves in which a threaded valve-stem raises or lowers the valve to open or close the port.

Our object is to produce a valve in which the valve-seat can be ground by the rotation of the valve-stem.

Our invention consists in the several novel features of construction and operation hereinafter described, and specifically set forth in the claim annexed. It is constructed as follows, reference being had to the accompanying drawings, in which—

Figure 1 is a vertical longitudinal sectional elevation of the globe-valve complete. Fig. 2 is a plan view of the wheel-handle. Fig. 3 is an isometrical elevation of our spoke-wrench used in rotating the valve-stem and valve in its seat to grind it.

A is the body of the valve, having a globular body 1, threaded tubular ends 2, to which the inlet and discharge pipes are connected, and a diagonal diaphragm 3, in which is located the valve-seat 4; and 5 is an elongated tubular branch threaded internally, and 7 is a tubular elongated screw-plug, comprising a shoulder or flange 8, above which is a tubular shank 9, and an externally-threaded stem which screws into the branch, and this stem is also threaded internally to receive the threaded portion of the lower end of the valve-stem. A stuffing-box 10 is fitted around the valve-stem and onto the top of the shank 9. The lower end of the valve-stem is provided with an ordinary conoidal head or valve fitting the seat 4. The body of the valve-stem above the threaded portion is made smaller than that part of the stem, so that the body will pass through the internally-threaded stem of the plug 7 without engaging with the thread.

At 11 we show a packing around the stem and below the plug.

In Fig. 3 we show a wrench having a shank 12, side arms 13, having jams 14 upon their ends adapted to fit over the arms of the hand-wheel, the top of the shank being adapted to fit into a bit-stock.

It will be observed that the threaded part of the valve-stem only occupies the lower part of the plug-stem when the valve is seated, and that by screwing the plug part way out and screwing the valve-stem inward the valve-stem will become wholly disengaged, and the valve and its stem can then be freely rotated in the plug to grind the valve in the seat.

When we wish to apply emery to the seat, we screw out the plug entirely, put in the emery, screw the plug in part way, and release the stem therefrom, as aforesaid, and rotate the stem and valve by the wrench and bit-stock until a proper seat for the valve is obtained. It will also be seen that ordinarily a valve may be reseated without removing any of the parts from the body of the valve.

What we claim is—

A valve-body provided with a valve-seat, a valve fitting therein, a plug screwed into the branch upon the valve-body, a threaded valve-stem screwing into the lower end of the plug and reduced in size above the threaded portion and extending upward through the plug and above it, and means for rotating the valve-stem.

In witness whereof we have hereunto set our hands this 8th day of November, 1889.

JAMES O. TEFFT.
CHARLES W. CARPENTER.

Witnesses:
WILLIAM V. SMITH,
JASPER E. SMITH.